Figure 1:
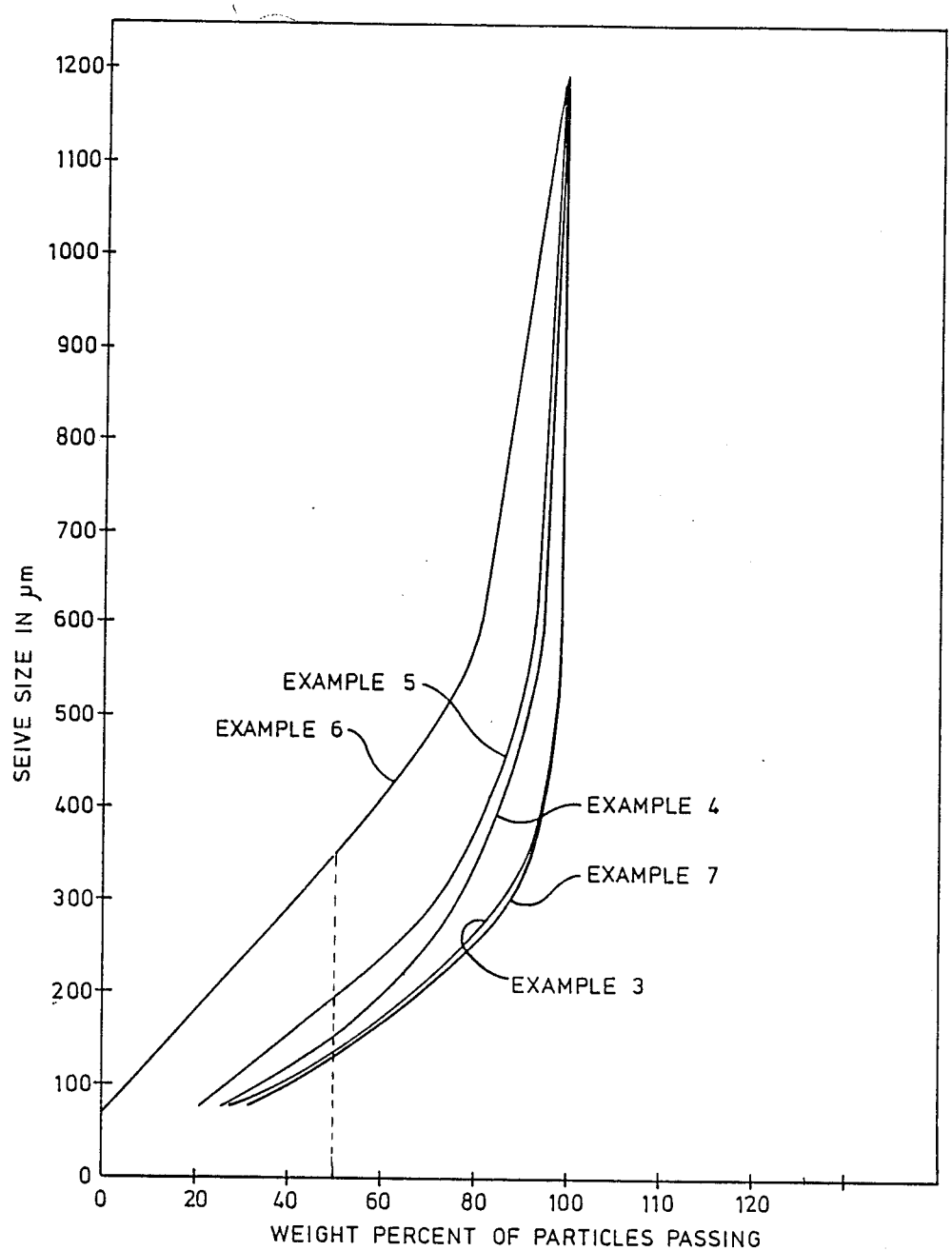

United States Patent [19]

Huddleston

[11] Patent Number: 4,865,642
[45] Date of Patent: Sep. 12, 1989

[54] PARTICLE AGGLOMERATION PROCESS

[75] Inventor: Douglas F. Huddleston, Mississauga, Canada

[73] Assignee: Iron Tiger Investments Inc., Burlington, Canada

[21] Appl. No.: 146,931

[22] Filed: Jan. 21, 1988

Related U.S. Application Data

[63] Continuation-in-part of Ser. No. 931,097, Nov. 17, 1986, abandoned.

[51] Int. Cl.$^4$ ............................................... C22B 1/14
[52] U.S. Cl. ............................................ 75/3; 75/256
[58] Field of Search ...................... 75/3, 4, 0.5 R, 25, 75/256

[56] References Cited

U.S. PATENT DOCUMENTS

| | | | |
|---|---|---|---|
| 3,174,846 | 3/1965 | Brisse et al. ............................. | 75/3 |
| 3,870,507 | 3/1975 | Allen ....................................... | 75/25 |
| 3,898,076 | 8/1975 | Ranke ...................................... | 75/3 |

Primary Examiner—S. Kastler
Attorney, Agent, or Firm—Rogers, Bereskin & Parr

[57] ABSTRACT

A method is described for utilizing metal containing by-products or waste products of metallurgical processes. The metal containing particles, or dust originating in metallurgical processes are agglomerated with a combustible agglomerating agent, and are usually charged to smelters, converters, or similar high temperature installations for the recovery valuable metals present in such dust particles. The agglomerates are obtained by mixing the dust particles with an amount of combustible agglomerating agent. The amount of agglomerating agent used for producing the agglomerates is related to the bulk specific gravity and the particle size range of the dust particles. The combustible agglomerating agent of this method, such as hydrocarbon wax, tar, bitumen, distillation, residue and similar combustible material, is solid at ambient temperatures.

In the preferred embodiment the combustible agglomerating agent is mixed with the dust particles at a temperature above the melting point of the agglomerating agent, the hot mixture is subsequently allowed to cool in a mould and compacted. The cooled compacts are removed from the mould before utilization. In a particular form of application of this invention the mixture is allowed to cool in combustible containers and may subsequently be utilized as compacts bonded to their containers.

The agglomerated particles may be used for non-combusted purposes as well, such as support structures or filling in cavities, or merely for protecting the environment from loose dust particles of metallurgical origin.

24 Claims, 1 Drawing Sheet

PARTICLE AGGLOMERATION PROCESS

THIS IS A CONTINUATION-IN-PART OF APPLICATION SER. NO. 931,097 FILED NOV. 17, 1986, now abandoned.

This invention relates to the field of agglomerating small particles.

Most metallurgical processes conducted at elevated temperatures produce fumes, vapours, or similar waste products with a small particle size which are subsequently collected, e.g. in dust bags, or by electrostatic precipitators, and similar devices. In certain metallurgical process steps, there may be spillage of molten metal or matte, which may then be broken up to small particle sizes to be recycled or reutilized. In some other processes, metallurgical slag, dross or ash which may contain metallic inclusions, is ground, and the metallic prills contained therein may be separated by physical separation processes.

In all the above, and in some similar processes, small particle size by-products are obtained which often have high heavy and/or so-called transition metal contents. The particular metals which are considered as heavy or transition metals are the following: copper, zinc, nickel, cobalt, iron, chromium, tungsten, vanadium, titanium, manganese, niobium, molybdenum, cadmium, tin, lead and similar metals that may appear in the by-products of processes involving metals. Some of these metals may also be referred to as refractory metals. In particular, such waste or by-products may contain precious and noble metals, and platinum group metals as well, which could then be subjected to further metal extraction processes for recovering such metals. Whatever the nature of the extractive process, the valuable metal containing waste and/or by-product must be charged by some convenient feeding means to the furnace or other facility wherein the recovery process is conducted.

In many metallurgical extractive process plants there is a constant dust problem. Dust which is produced is often blown into the atmosphere and settles throughout the plant. It is a known practice to collect the metallurgical by-product and place it in combustible bags. The bag containing the dust is thrown, or transferred, into the furnace. This step, however, often leads to a substantial portion of the dust being blown into the surrounding atmosphere by the furnace draught and lost or redistributed throughout the plant.

In other known practices, the metallurgical waste and/or by-product is stored outdoors in dump heaps. The dust stored in such heaps is often blown away by wind, washed away by rain and snow, and as such becomes a source of environmental concern, before it can be utilized as, for instance, furnace feed or mine backfill or is otherwise reused.

Thus there is a need for an economical method for agglomerating collected metallurgical by-products which are in the form of dust granules or of similar small particle size, whereby the storage, utilization, or recycling to metal extraction steps of such by-products can be satisfactorily achieved.

Metal containing particles are briquetted with a binder which comprises a combustible material, and are subsequently heat treated and cured according to processes described in U.S. Pat. No. 3,341,642 (issued to J. H. Mahar et al. in September 1967) U.S. Pat. No. 3,870,507 (issued to J. E. Allen in March 1975) and U.S. Pat. No. 3,898,076 (issued to R. L. Ranke in August 1975). The heating or curing treatment may require a special furnace designed for this particular heating step which further increases the cost of preparing compacts for the reutilization of by-products.

Processes whereby a combustible material such as sulphur or bitumen, is added to particles in a certain weight percent range are described in U.S. Pat. No. 2,547,691 (issued to R. H. Churchill in 1951) and in U.S. Pat. No. 3,174,846 (issued to A. H. Brisse et al. in 1965). The weight percent range of addition of an agglomerating agent which is suitable for making compacts of heavy materials composed of larger particles, however, will not be applicable to compacting fine dust of a light material.

A new method has now been found for agglomerating dust particles originating in metallurgical processes, with a combustible agglomerating agent, comprising the mixing of the dust particles with an amount of combustible agglomerating agent, which amount is related to the bulk specific gravity and to the particle size range of the particles. The amount of combustible agglomerating agent, the average particle size, and the bulk specific gravity of the dust particles are correlated in an emperical relationship such that it provides a numerical range in which compacts with desirable properties are obtained. The dust particles are mixed with the predetermined amount of combustible agglomerating agent and subsequently compacted.

In order to provide for better understanding of the invention, a preferred embodiment of the invention will be described below and its application illustrated by ways of working examples.

FIG. 1 shows particle size distribution curves which illustrate the determination of the average particle size of the dust and by-products utilized in the examples for making compacts with a combustible agglomerating agent according to this invention.

The valuable metal containing particles, such as dust and condensate collected in fume hoods, electrostatic precipitators, cyclones, or similar solid particle collecting devices, particles collected by means of granulating slag or dross, or any other granules or particles containing metals which are waste and/or by-products of metallurgical processes, will be referred to hereinafter as dust particles. In the preferred embodiment of this process the metal containing dust particles are mixed with a hydrocarbon wax agglomerating agent.

The physical characteristics of the dust particles considered when calculating the required range of the amount of the agglomerating agent to be used for obtaining compacts are relatively easy to determine and do not require elaborate instrumentation. The bulk specific gravity is measured in weight per unit volume, usually in gram per cubic centimeter ($g/cm^3$), or Kg per $m^3$. The bulk specific gravity will also give some guidance regarding the degree of fineness of the particles, and its determination does not require the production of solid blocks of material, which are considered necessary for the determination of specific gravity of a solid. The bulk specific gravity of the dust particles under consideration will be abbreviated to BD in the following discussion and numerical correlation.

The amount of agglomerating agent required for compacting dust particles is calculated by considering the size range of the particles as well. The smaller the particles, the higher the amount of agglomerant required to make the particles into a coherent piece of material, such as a compact. Particle size ranges may be easily determined by so-called sieve tests. In these determinations the weight percent of the material which passes through the holes of a certain sized sieve is measured. FIG. 1 shows size distribution curves of different dust particles, in which hole sizes of the sieve are plotted against the weight percent of the material passing through the holes. The diameter, or width, of the holes is given in microns ($\mu$m or $10^{-6}$m). In the preferred embodiment the specific sieve size (S) is considered which allows 50 weight percent of the dust particles to pass through it. This is referred to as the average particle size of the dust particles, and indicated in FIG. 1 by the dotted line.

The agglomerating agent in the present invention may be any type of hydrocarbon wax, which may be the by-product of a distillation process or the residue of other known hydrocarbon separation processes. In the application of the invention to metallurgical dust particles, it is necessary that the agglomerating agents be substantially combustible, such that when the obtained agglomerates are charged to the furnace the hearth temperature in not diminished by a substantial value. In other words, it is an important facet of the present process that the heat required to melt the dust particles and the agent, is provided at least partly, by the combustion of the agglomerating agent. In comparison, a non-combustible agglomerating agent would require an additional amount of heat energy to melt it, and would in most cases, also increase the slag burden.

Depending on the origin of the wax, it usually contains some oil. The agglomerating agent utilized in the preferred embodiment of this invention is hydrocarbon wax containing less than 26 weight percent oil. Such hydrocarbon waxes are commercially available at relatively low costs. It is desirable but not essential, that the wax has a melting point which is higher than 120° F. (49° C.).

Any substantially fully combustible material which is not fluid at ambient temperature, such as tar, bitumen, residual oil, may also be utilized in compacting dust particles according to the present invention.

It has been found that a convenient way to correlate the amount of agglomerating agent to the bulk specific gravity and to the particle size range of the dust particles is the following expression:

The multiplication product of the average particle size, the bulk specific gravity, and weight percent of the agglomerating agent is divided by 100, and to this numerical figure is added the weight percent of the agglomerating agent multiplied by a constant.

The numerical correlation utilized in the preferred embodiment for determining the amount of agglomerating agent required is represented by the following expression:

$$\frac{S(\mu m)}{100} \times BD \, (g/cm^3) \times wt.\% + 2 \, wt.\% = R$$

It has been found that the value of R should generally fall between 20 and 220 for obtaining compacts which may be easily handled without breaking, crumbling and producing dust. In particular, it has been found that in instances when $$\frac{S(\mu m)}{100} \times BD \, (g/cm^3)$$

has an intermediate numerical value of less than 10, then the value of R of a desirable compact falls between 20 and 70.

When the numerical value of $$\frac{S(\mu m)}{100} \times BD \, (g/cm^3)$$

is greater than 10, the R value range of a compact with desirable handling properties may be extended to 220. The upper limit of this range is dictated by economic considerations. If there is a cheap source of agglomerating agent available which, while providing compacts for charging dust particles to a furnacing operation will also provide fuel, an appropriate R number which is above the value of 220 may also be acceptable.

A hydrocarbon wax, often referred to as paraffin wax, is generally considered to be a long chained hydrocarbon with substantially saturated carbon to carbon bonds; but some other organic compounds containing oxygen and nitrogen as well, may also fall into this broad category. A hydrocarbon oil is understood to be a similar essentially carbon and hydrogen containing long chained or branched molecule with a much higher number of unsaturated carbon bonds than are to be found in a wax.

In the preferred embodiment of the invention the dust particles and the hydrocarbon wax are mixed at a temperature above the melting point of the hydrocarbon wax. There are various process step sequences in which the mixing of the particles with hydrocarbon wax may be achieved, producing equally good results.

In one process step sequence the wax is heated separately above its melting point and subsequently mixed with the dust particles at ambient temperature.

In another step sequence the melted wax is mixed with dust particles heated prior to mixing.

In yet another step sequence the dust particles are heated to a temperature above the melting point of the agglomerating agent, and when the agglomerating agent is added, it melts and is mixed simultaneously.

Yet another variation in the process of mixing is the charging of the agglomerating agent and the dust particles, both at ambient temperature, to a heated container equipped with mixing means. A specific form of such an apparatus is a rotating drum.

Which of the above sequences is selected to obtain a hot mixture of the dust particles with the agglomerating agent is dictated by convenience only.

It has been also found that in producing compacts for recycling fine dust particles to a furnace, harder and more easily handled compacts may be obtained by adding the agglomerating agent in two stages to the dust particles. In such a mixing process a portion of the calculated amount of the required agglomerating agent is mixed and heated with the total amount of the dust particles to be compacted. The resulting hot mixture is then mixed with the remaining portion of the agglomerating agent, and the final slurry is then allowed to cool to ambient temperature.

The mixture may be allowed to cool between the addition of the first portion of the agent and the second addition of the agglomerating agent.

In the above instances, it is convenient to use a powered mixing device to mix the dust particles with the wax, but clearly, it may be accomplished manually as well.

In the preferred embodiment, the resulting mixture forms a hot slurry which is then poured in some conveniently shaped container or mould. The cooled compacts are usually easily removable from the moulds or containers.

In another form of utilizing the present invention the container is also combustible and the hot slurry of the dust particles mixed with the agglomerating agent could form a bond with the container on cooling. The cooled agglomerated dust contained in a combustible container can be handled with ease, charged to a furnace for remelting and further extraction. In other instances, the agglomerates bonded to their containers can be stored and put to further use, such as for example mine back-filling, when needed.

A particularly advantageous container is rolled paper or cardboard cylinder, typically used as a form for solidifying concrete. One example of such a cardboard cylinder is identified by the Trade Mark "SONOTUBE", which usually consists of layers of rolled paper glued together with an adhesive.

In the following examples manual preparation of compacts are described. In some instances the still hot slurry surface is compacted by flattening and pressing it with a heavy flat metallic object. This step is generally referred to as tamping.

The hot slurry may also be compacted by its own weight as it cools to ambient temperature.

The resulting agglomerated compacts usually have sufficient impact strength to be handled without crumbling or losing their shape during handling. The compacts, when made according to the present invention, do not produce any notable amounts of dust even when broken.

The method of operation and application of the preferred embodiment of the present invention will now be further illustrated by working examples.

EXAMPLE 1

2500 grams (5.50 lbs.) of a copper-nickel containing dust obtained as a byproduct of a commercial smelter operation, was heated in a loosely covered container for 75 minutes and with temperature controller set at 170° F. (77° C.). The dust had a particle size of 100% less than 2 mm cross-section with about 50% passing through a sieve size of 170 μm. The bulk density of the copper-nickel dust was found to be 3.89 g/cm³. 200 grams of a low melting point wax, such as No. 2280 White Crude Scale wax marketed by International Waxes Limited, having a melting point of 121°-125° F. (49°-52° C.) determined in accordance with ASTM Test D87, was heated to 140° F. (60° C.) over a warm water bath with stirring until it was completely and homogeneously fluid.

The wax utilized in this example can be further described as:

| | |
|---|---|
| AMP melting point | 124–128° F. |
| Oil content (ASTM D721) | maximum 2% |
| Viscosity (ASTM D445) | 3.0–4.0 centistokes at 98.9° C. |

The molten wax and the heated dust were mixed by hand, in a pan open to the atmosphere, with heating controlled at 170° F. (77° C.). The hand mixing was continued for approximately 11 minutes, and the mixture was heated without further mixing for an additional 15 minute period.

The value of R calculated by using the relationship combining bulk density, particle size of the dust, with the value of 8% of wax added:

$$\frac{170}{100} \times 3.891 \times 8 + 16 = 68.9$$

This numerical value is within the useful numerical range of the formula described above.

A 6" diameter SONOTUBE section about 3" in height and having about ⅛" wall thickness was placed on a flat surface and the hot slurry of the dust particles mixed with wax was poured into it. The surface of the slurry after it set in the tube section, was pressed down by hand. Subsequently the cooling slurry was compacted in the containing tube section by tamping with a heavy flat tool such as a flat headed rod, by 25 blows.

The slurry set in two hours, and had a hard surface. One hour and a half after pouring, the temperature of the compacted agglomerate was 120° F. (49° C.).

The dust agglomerate was bonded firmly to the SONOTUBE ring. The surfaces were firm, no crumbling or breaks were observed after two months. The compacted agglomerate could be easily handled and transported.

EXAMPLE 2

2000 grams (4.40 lbs.) of metallurgical dust containing nickel and copper compounds similar to the dust particles of Example 1, were mixed with 200 grams of paraffin wax of the same description as in Example 1. The wax has been previously heated to 158° F. (70° C.) over a hot-water bath. The mixing took place in an open container held over a steam bath at 302° F. (150° C.). The slurry was poured in a mould lined with aluminium foil and compacted with a heavy tool. The cold compacted agglomerate was removed from the mould. It was hard, retained its shape for several months and could be handled and dropped without crumbling and without any damage.

EXAMPLE 3

1500 lbs of copper and nickel containing dust resulting from mixing flue dust, Cottrell dust, dust removed from electrostatic precipitators and similar by-products of a commercial smelter operation, were utilized to produce compacts for subsequent use. The dust had a particle size range of 100% less than 1.18 mm (Tyler mesh size 16). When plotting the particle size distribution against sieve size, as shown in FIG. 1, 50% of the dust was found to be less than 150 μm in size. The bulk specific gravity of the metallurgical dust was determined and was found to be 3.73 g/cm3. The dust was heated to 250° F. (127° C.) in a large metal pan before the addition of the agglomerating agent.

Refined hydrocarbon wax, having an AMP melting point of 124°-128° F. and oil content (ASTM D721) of maximum 2%, was heated to 400° F. (204° F.) in a separate container and the hot hydrocarbon wax was added to the preheated dust with hand stirring, in an amount equivalent to provide 7 wt. % hydrocarbon wax in the mixture. The temperature of the mixture was 275° F. (135° C.). After thorough mixing, the slurry was poured into brick-shaped metal moulds and allowed to cool to room temperature.

The bricks were removed from the containers. They were hard, firm to the touch, did not break when dropped and could be transported in large bags or similar containers for loose holding of the bricks without producing noticeable dusting or chipping.

The R value of this mixture utilizing the experimentally determined bulk specific gravity and particle size figures shown above is:

$$R = \frac{150}{100} \times 3.73 \times 7 + 14 = 53.2$$

EXAMPLE 4

2,500 lbs. of nickel and copper containing dust collected as various by-products of a commercial smelter operation were placed in a metallic container, preheated to 250° F. and refined hydrocarbon wax described by the same characteristics as in Example 3, was mixed with the dust in an amount to provide a mixture containing 6 wt. % combustible agglomerating agent. Heat to the metallic container was turned off as soon as the wax was observed to melt. The dust and the wax were thoroughly hand mixed. The nickel and copper containing dust had a bulk specific gravity of 3.92 g/cm$^3$. When plotting the size distribution against the particle size, it was found that 50% of the dust was smaller than 150 $\mu$m in diameter. The temperature of the mixture was found to be 175° F. (79° C.), and was in a form of pourable slurry.

The slurry was poured into brick-shaped moulds and allowed to cool. The bricks when cooled to ambient temperature, that is in about 8 hours, were easily removed from the mould and were found to be hard. The bricks could be handled with ease and were transportable in loosely packed form without chipping or noticeable dusting.

The R value of the bricks of this example when calculated using the above values is :

$$R = \frac{150}{100} \times 3.92 \times 6 + 12 = 47.3$$

EXAMPLE 5

1500 lbs of copper and nickel containing dust containing various by-products and waste products of a commercial smelter operation was placed in a steel pan heated to 150° F., together with refined hydrocarbon wax to provide 4 wt. % combustible agglomerating agent containing mixture. The hydrocarbon wax was of the same composition as in Examples 3 and 4. Heating of the pan was stopped when the mixture reached 150° F., (71° C.), stirring by hand was continued until the mixture was well mixed and uniform. The mixture was well wetted by the wax but not pourable. The hot mixture was loaded into brick shaped moulds, and the surface was flattened by a hard implement, and was allowed to cool to ambient temperature.

The dust before the hydrocarbon wax addition was found to have bulk specific gravity of 3.90 g/cm$^3$ and an average particle size of 195 $\mu$m (50% of the particles were smaller than 195 $\mu$m in size).

The bricks were easily removed from the mould. They were less waxy to the touch than the compacts of Example 3 and 4. They could be handled without breaking and could be transported. The bricks crumbled to a small extent at the edges and corners, but there was no noticeable amount of dusting, hence they still satisfied the requirements to produce compacts without dust.

The compacts made according to the above conditions had the following value for R:

$$R = \frac{195}{100} \times 3.90 \times 4 + 8 = 38.6$$

EXAMPLE 6

Dust and small particle size by-products, containing copper and nickel compounds, originating in a commercial smelter operation were agglomerated with hydrocarbon wax additions in a heated rotating drum. The drum was heated by an externally placed burner. The drum temperature was measured on its external surface by a contact thermometer. The inside temperature of the drum was found to be more than 100 degrees below the measured temperature, depending on the period of heating. The metallurgical dust utilized in this example had a bulk specific gravity of 3.49 g/cm$^3$ and 50% of the dust by weight passed through a sieve having hole sizes of 345 $\mu$m.

The hydrocarbon wax used as agglomerating agent was commercially available, marketed by Imperial Oil Limited as wax No. 778, having characteristics as provided by the manufacturer:

| | |
|---|---|
| Melting point (ASTM D127) | 145° F. (63° C.) |
| Oil content wt. % | 16 |
| Flash point (ASTM D92) | 480° F. (250° C.) |
| Viscosity (ASTM D445) | 7.2 centistoke at 100° C. |

The conditions of making the compacts from the dust and wax are described in Table I below. In most of the tests listed the compacts were prepared by adding No. 778 hydrocarbon wax to the rotating drum followed by dust addition, and thereby simultaneously heating and mixing the ingredients. In a few indicated tests the components were preheated separately. The mixing temperatures shown are estimates based on external measurements. The period of mixing varied between 10 to 20 minutes. The hot mixture was charged to metallic containers. The surface of the mixture in the containers was tamped and compacted by applying light pressure to its surface.

The composition of the compacts produced, description of conditions in preparation and their respective evaluation are tabulated in Table 1.

This set of tests was designed to show that when the values of R fall within the numerical range further improvements may be achieved by varying the mixing procedure as shown by observations in Table 1. All the above compacts had values of R greater than 20 and all the compacts obtained were transportable and showed no dusting, hence could be easily recycled to the smelter for further recovery.

TABLE 1

Compacts Made of Nickel and Copper Oxide Bearing Dust
Bulk Specific Gravity: 3.49 g/cm³; Average Particle Size = 345 μm

| Sample No. | Wt. % Wax Added | Heating & Mixing Step | No. of Wax Addition Stages | R Values | Description of Compacts |
|---|---|---|---|---|---|
| 6.31 | 3 | Wax & dust mixed & heated together at temp. ≃ 300° F. (149° C.) for 5 mintes | 1 | 42.1 | Tamped; grainy compacts, transportable loose, no dust |
| 6.32 | 3 | Dust mixed with half of wax added at temp. ≃ 300° F. (149° C.) for 5 min. Mixed subsequently with balance of wax to be added at temp. ≃ 300° F. for 6 minutes | 2 | 42.1 | Tamped; grainy compacts, transportable loose in container. No dust formed No crumbling |
| 6.511 | 5 | 10 minute mixing in drum to ≃ 200° F. with wax heated to 180° F. (82° C.) | 1 | 70.0 | Grainy compacts, tamped, no dust, no cumbling |
| 6.512 | 5 | 5 min. mixing & simultaneous heating in drum at 200° F. (93° C.) | 1 | 70.0 | Hand tamped, transportable, no dust, minimal crumbling |
| 6.101 | 10 | Wax heated to 150° F. (71° C.) Dust added & mixed at 250° F. (127° C.) for 10 minutes | 1 | 140.4 | Tamped; hard compacts, No crumbling, no dust |
| 6.15 | 15 | Mixing & heating as in 6.101 | 1 | 210.6 | As in test 6.101 |

EXAMPLE 7

Dust and small particle size by-products containing nickel and other heavy metal compounds and originating in a commercial smelter operation, were agglomerated in a heated rotating drum with hydrocarbon wax additions. The drum was heated externally by a burner, and the temperature was measured for convenience on the external surface by a contact thermometer. The temperature of the mixture during mixing was more than one hundred degrees below the measured temperature, depending on the length of the mixing period. The temperature of the mixtures inside the rotating drum is estimated, based on external temperature measurements. The characteristics of the agglomerating hydrocarbon wax used in this example is the same as described in Example 6.

The dust utilized in these tests was of bulk specific gravity 2.43 g/cm³. 100% of the dust passed through Tyler sieve size 16, that is all the particles were smaller than 1.18 mm diameter. The size distribution curve in FIG. 1 shows that 50 wt. % of the dust passed through a sieve having hole sizes 137 μm.

The variations in the mixing procedures are recorded in Table 2. The calculated R values are shown in the appropriate column.

The hot mixture was charged to metallic containers and light pressure was applied to its surface by a flat metallic object. The compacts were removed from the metallic containers after having cooled to ambient temperature. Observations regarding the appearance and nature of the compacts obtained are listed in Table 2.

TABLE 2

Compacts Obtained with Nickel and Other Heavy Metal Containing Dust
Bulk Specific Gravity: 2.43 g/cm³; Average Particle Size = 137 μm

| Sample No. | Wt. % of 778 Wax Added | Heating & Mixing Procedure | No. of Wax Addition Stages | R Values | Description of Compacts |
|---|---|---|---|---|---|
| 7.2 | 2 | Wax & dust added to hot drum at 240° F. (115° C.) Mixed & heated for 5 min. | 1 | 10.6 | Insufficient Wetting, Compacts cannot be formed |
| 7.41 | 4 | Wax & dust added to hot drum at 240° F. (115° C.) Mixed & heated for 5 min. | 1 | 21.3 | Coherent compact but breaks easily, no dusting |
| 7.42 | 4 | Dust & half of wax to be added mixed in hot drum heated to 240° F. (115° C.) for 5 minutes. Second half wax added to mixture in subsequent heating step at 240° F. in 5 minutes | 2 | 21.3 | Coherent compacts; slight imporvement over 7.41 compacts; breaks when dropped, no dusting |
| 7.422 | 4 | As test No. 7.42 but allowed to cool between wax additions | 2 | 21.3 | Compacts coherent and harder than 7.42; no dusting, no crumbling |
| 7.5 | 5 | Wax & dust added to drum at 240° F. (115° C.) mixed for 5 minutes | 1 | 26.7 | Compact coherent & hard, Has granular surface, no dusting |
| 7.6 | 6 | Dust & wax added to drum at 240° F. (115° C.) mixed for 10 minutes | 1 | 32.0 | Coherent hard compact; no breakage on dropping from 4 ft. height |
| 7.8 | 10 | Dust & wax added to drum at 240° F. (115° C.) for 10 minutes | 1 | 53.3 | Hard solid compacts, no crumbling, no dusting, |

TABLE 2-continued

| | | Compacts Obtained with Nickel and Other Heavy Metal Containing Dust Bulk Specific Gravity: 2.43 g/cm³; Average Particle Size = 137 μm | | | |
|---|---|---|---|---|---|
| Sample No. | Wt. % of 778 Wax Added | Heating & Mixing Procedure | No. of Wax Addition Stages | R Values | Description of Compacts |
| | | | | | hard edges |

Compacts, when made with fine dust containing nickel and other metals with wax additions calcuated to provide R values higher than 20, were all satisfactory. Some improvements in hardness of compacts were noted when wax was added in two stages.

EXAMPLE 8

A by-product of a process containing substantially silicon and copper particles, was required to be compacted for recycling to a metallurgical furnacing operation. The by-product had a bulk specific gravity of 0.95 g/cm³ and 50 wt. % of the particles passed through a sieve having 25 μm diameter holes.

The compacts were made of a hydrocarbon wax agglomerating agent marketed by International Waxes Limited, No. 2280. The characteristics of this wax were given in Example 1.

The wax was heated in an open container to above its melting point, that is about 190° F. (88° C.) prior to mixing.

The copper and silicon bearing particles were heated in another open container to 150° F. (71° C.). In the tests of this example the wax was added in two portions and in two steps. In the first step the particles were thoroughly hand mixed with the first portion of the wax. The second portion of the wax was also preheated and added to the hot mixture in a subsequent step with stirring. The hot mixture was transferred to metallic containers, tamped by a flat faced metallic object and allowed to cool to ambient temperature. The cool compacts were removed from the container, visually inspected and tested by a drop test from 6 ft. height. The conditions of perparation and observations are tabulated in Table 3.

Compacts produced in the tests by means of 2 stage additions of hydrocarbon wax were very satisfactory. Their R value fell within the predetermined range.

passed 137 μm hole sieve, determined according to FIG. 1.

In this test International Waxes Limited No 431 was used for agglomeration. IWL No. 431 wax contains 25% oil and has a melting point of 146° F. (63° C.).

The above dust particles were heated in a container to 150° F. Unheated wax to provide a 4 wt. % mixture was added with stirring. The heating and mixing was continued for 10 minutes. The temperature of the mixture at the end of this period was 170° F. (82° C.). The mixture was poured into a metallic mould, tamped and allowed to cool. The compacts were removed from the moulds and tested visually as well as by drop test.

The compacts obtained had grainy appearance but were reasonably hard. They broke into two to three pieces when dropped from 6 ft. height but there was no dust formation $$R = \frac{2.43 \times 1.37}{100} \times 4 + 8 = 21.3$$

The R value was close to the lower limit of the range specified by the numerical relationship of this invention. The compacts were still acceptable with respect to their suitability for transport without dusting.

In the preferred embodiment the average particle size of the dust was determined by size distribution curves shown by FIG. 1. There are other ways of characterizing the particle size distribution of the dust particles to be agglomerated according to this invention, such as for example by means of Tyler mesh sizing. Other means for assessing the size distribution range of particles would be obvious to a person skilled in the art.

Another method of obtaining compacts is charging the dust particles interspersed with agglomerating agent in the desired amount, at ambient temperature, to a suitable equipment which mixes and extrudes the compacts and agglomerates at ambient temperature.

TABLE 3

| | | Compacts Made of Copper and Silicon Bearing Material, BD: 0.95 g/cm³; Average Particle Size = 25 μm | | | |
|---|---|---|---|---|---|
| Sample No. | Wt. % of 2280 Wax Added | Heating & Mixing Procedure | No. of Wax Addition Stages | R Values | Description of Compacts Obtained |
| 8.142 | 11 | Wax at 200° F. mixed with particles & subsequently with mixture at 150° F. | 2 | 24.6 | Good compacts, slight crumbling, no dusting |
| 8.162 | 18 | Wax at 200° F. mixed with particles & subsequently with mixture at 150° F. | 2 | 40.3 | Hard compacts, no crumbling, no dusting |
| 8.222 | 22 | Wax mixed in stages as in 8.142 and 8.162 | 2 | 49.2 | Very hard compacts |

EXAMPLE 9

Nickel and other metal containing dust, e.g. flue dust, collected as by-product and waste products of a commercial smelter operation was compacted for recycling to a furnace. The dust had bulk specific gravity (BD) 2.43 g/cm³. 100% of the particles were less than 1.18 mm in size, i.e. passed through No. 16 Tyler mesh. 50%

The method of agglomeration described and illustrated in the foregoing is directed to recovering valuable metals from dust particles originating in metallurgical processes, by subsequently feeding the resulting compacts to a furnacing operation. The method of agglomeration is also applicable to obtaining compacts for storage and for preventing the dust particles from becoming an environmental hazard.

Although the present invention has been described with reference to the preferred embodiment, it is to be understood that modifications and variations may be resorted to without departing from the spirit and scope of the invention, as those skilled in the art will readily understand. Such modifications and variations are considered to be within the purview and scope of the invention and appended claims.

We claim:

1. A method of agglomerating dust particles comprising non-ferrous metals and compounds thereof, having non-uniform size distribution, originating in metallurgical processes, with a combustible agglomerating agent, comprising the steps of:
    (a) determining the bulk specific gravity of dust particles comprising non-ferrous metals and compounds thereof, originating in metallurgical processes, by weighing said dust particles and obtaining the bulk specific gravity, expressed as weight of said particles contained in a unit volume;
    (b) weighing an amount of said dust particles and passing it through a series of sieves in sequence of diminishing hole sizes, and obtaining the particle size range of said dust particles;
    (c) calculating the amount of combustible agglomerating agent required to agglomerate said dust particles comprising non-ferrous metals and compounds thereof into compacts, by utilizing an empirical relationship, wherein an agglomerating factor R is related to the bulk specific gravity as determined in step (a), to the particle size range of said particles as determined in step (b), and to the amount of agglomerating agent, such that $$R = \left( BD \times \frac{S}{100} \times Aa \right) + 2\,Aa,$$

wherein said empirical relationship BD is bulk specific gravity (g/cm$^3$), S is sieve hole size ($\mu$m) and Aa is agglomerating agent (wt/%), said sieve hole size in said empirical relationship being the sieve size allowing the passage of 50 wt/% of said particles, and whereby the appropriate wt/% range of said agglomerating agent for obtaining compacts of said dust particles is obtained, provided said R factor has a value falling between 20 and 220;
    (d) mixing said calculated amount of combustible agglomerating agent with an amount of dust particles, as determined in step (c), and
    (e) compacting the resulting mixture at ambient temperature and pressure.

2. A method according to claim 1 wherein said R factor has a value of less than 70 but is in excess of 20, in those cases in which the calculation yields an initial multiplication value of less than 10 in the step of multiplying said said bulk specific gravity (g/cm$^3$) with said sieve hole size ($\mu$m) and dividing by 100, in utilizing said empirical formula.

3. A method according to claim 1, wherein the non-ferrous metals and compounds thereof contained in said dust particles is at least one of the group consisting of base metals, transition group metals, refractory metals, noble metals, and platinum group metals.

4. A method according to claim 1, wherein said combustible agglomerating agent is one of the group consisting of hydrocarbon wax, heavy residual oil, bitumen, tar, and pitch.

5. A method according to claim 4 wherein said agglomerating agent contains less than 26% by weight hydrocarbon oil.

6. A method according to claim 1 wherein said mixture is compacted by its own weight.

7. A method according to claim 6, wherein said mixture is compacted in a non-combustible container.

8. A method according to claim 1, wherein said dust particles are heated to a temperature above the melting point of said agglomerating agent prior to mixing with said agglomerating agent.

9. A method according to claim 1, wherein said agglomerating agent is heated above its melting point prior to mixing with said dust particles.

10. A method according to claim 1, wherein said dust particles are mixed and heated with said agglomerating agent by powered mixing means.

11. A method according to claim 1, 8 or 9, wherein said dust particles and said agent are heated separately and mixed subsequently.

12. A method according to claim 1, wherein said dust particles are mixed with said agglomerating agent in two stages, the first stage comprising the mixing of said particles with a portion of said agglomerating agent and second stage comprising the mixing of the mixture resulting from the first stage with the remaining portion of said agglomerating agent.

13. A method according to claim 12, wherein the mixture is at ambient temperature prior to said second stage of mixing.

14. A method according to claim 1, wherein said particles are mixed with said agglomerating agent at ambient temperature by powered mixing means and extruded as compacts.

15. A method according to claim 1, wherein said dust particles are at least one of the group consisting of: flue dust, dust collected in an electrostatic precipitator, particles of spillage, condensed fumes of metallurgical processes and particles of slime obtained in electrolytic processes.

16. A method according to claim 1, wherein said dust particles are entrained in solidified, previously molten metallurgical by-products.

17. A method according to claim 1, wherein said dust particles are waste products of metal working processes.

18. A method according to claim 6, wherein said mixture is further compacted by pressure less than 10 kg/cm$^2$ applied to the top surface of said particles agglomerated by their own weight at ambient temperature, in a container.

19. A method according to claim 7, wherein said mixture is compacted in and bonded to the walls of a combustible container at ambient temperature, and is retained therein.

20. An agglomerated product comprised of dust particles comprising non-ferrous metals and compounds thereof, having non-uniform size distribution, originating in metallurgical processes, and a combustible agglomerating agent, wherein the amount of combustible agglomerating agent added to said particles has been determined by a calculation utilizing an empirical relationship between the bulk specific gravity and the particle size range of said dust particles, agglomerating factor R and said amount of combustible agglomerating agent expressed in weight percent, in accordance with an empirical formula such that $$R = \left(BD \times \frac{S}{100} \times Aa\right) + 2\,Aa$$

wherein BD is bulk specific gravity (g/cm$^3$), S is sieve hole size ($\mu$m), and Aa is agglomerating agent (wt./%), said sieve hole size in said empirical formula being the sieve size allowing the passage of 50 wt/% of said particles, and whereby the appropriate wt/% range of said combustible agglomerating agent for obtaining compacts of said dust particles comprised of non-ferrous metals and compounds thereof is obtained, provided said R factor has a value falling between 20 and 220, said calculated amount of agglomerating agent having first been mixed with said dust particles and said mixture having been subsequently compacted at ambient temperature.

21. An agglomerated product as claimed in claim 20, wherein said combustible agglomerating agent comprising said product has been mixed at elevated temperatures with said dust particles prior to compacting at ambient temperature.

22. An agglomerated product as claimed in claim 21, wherein said dust particles and said agent have been mixed at elevated temperatures in two separate steps prior to compacting at ambient temperature.

23. An agglomerated product as claimed in claim 20, or 21, which has been compacted substantially by its own weight.

24. An agglomerated product as claimed in claim 20, 21 or 24 which has been compacted at ambient temperature in a combustible container and retained therein.

* * * * *

UNITED STATES PATENT AND TRADEMARK OFFICE
CERTIFICATE OF CORRECTION

PATENT NO.  : 4,865,642
DATED       : Sept. 12, 1989
INVENTOR(S) : DOUGLAS F. HUDDLESTON AND NEIL L. SMITH It is certified that error appears in the above-identified patent and that said Letters Patent is hereby corrected as shown below:

On the Title Page, point [75] after Mississauga, add

-- Neil L. SMITH, Oakville, both of --

On the Last Page, column 16, claim 24 line 2, delete after or -- 24 -- and add

-- 23 --

Signed and Sealed this

Second Day of October, 1990

Attest:

HARRY F. MANBECK, JR.

*Attesting Officer*      *Commissioner of Patents and Trademarks*